United States Patent [19]

Gaddi

[11] Patent Number: 4,523,660
[45] Date of Patent: Jun. 18, 1985

[54] BEARING BODY FOR MOTORCYCLE

[75] Inventor: Bruno Gaddi, Pisa, Italy

[73] Assignee: Piaggio & C. S.p.A., Genoa, Italy

[21] Appl. No.: 446,617

[22] Filed: Dec. 3, 1982

[30] Foreign Application Priority Data

Dec. 9, 1981 [IT] Italy ............................. 23724/81[U]

[51] Int. Cl.$^3$ ............................................ B62K 25/02
[52] U.S. Cl. ................................... 180/228; 180/295; 180/296
[58] Field of Search ............... 180/219, 225, 228, 295, 180/296, 89.2, 309; 280/281 B

[56] References Cited

FOREIGN PATENT DOCUMENTS 542641 11/1955 Belgium ............................. 180/219
1170051 1/1959 France ................................ 180/219

Primary Examiner—David M. Mitchell
Assistant Examiner—Michael Mar
Attorney, Agent, or Firm—Cushman, Darby & Cushman

[57] ABSTRACT

A bearing body for motorcycles with rear drive wheel borne in cantilever fashion by an oscillating arm fulcrummed to said body and bearing also the engine/transmission assembly with related exhaust pipe silencer, comprising in its lower part anterior to the fulcrum of said oscillating arm a cavity for free partial housing of said silencer.

2 Claims, 3 Drawing Figures

BEARING BODY FOR MOTORCYCLE

The object of the present invention is a bearing body for motorcycles, such as motorscooters, which features constructional artifices of a kind that permit a useful arrangement of the exhaust pipe silencer.

The exhaust pipe silencer of a motorcycle is generally disposed on one side of the vehicle. For example, motorscooters are known which have their rear drive wheel mounted in cantilever fashion on an oscillating arm which also bears the engine/transmission assembly disposed on one side of the vehicle, the exhaust pipe silencer being disposed on the opposite side of the vehicle. With this arrangement, the exhaust pipe silencer is located laterally to the rear drive wheel and is free to oscillate.

In certain cases a lateral disposition of this kind of the exhaust pipe silencer may prove inconvenient if a free space beside the rear drive wheel is required. Such requirement may for example occur when it is wished to fit a spare wheel in the interior of the lateral cowl of a motorscooter on the side opposite the part of the cowl which partially houses and engine transmission assembly. In the former lateral cowl, because of the narrowness of the aperture that can be made in its wall, the spare wheel cannot be removed from and replaced in said cowl except by moving it parallel to the side of the bearing body.

It is consequently the object of the present invention to embody a bearing body for motorcycles which allows the engine exhaust pipe silencer to be disposed otherwise than laterally to the rear drive wheel.

To attain this object the invention provides for a cavity adapted to partially house the exhaust pipe silencer and formed in the lower portion of the vehicle bearing body in a position anterior to the fulcrum of the oscillating arm bearing the rear wheel and related engine/transmission assembly.

In this way, the exhaust pipe silencer can come to have a substantially central disposition in the longitudinal plane of the vehicle, sufficiently clear of the ground to prevent the risk of impacts against unevenesses of the ground and leaving entirely free and unencumbered the lateral space of the vehicle beside the rear wheel.

Further constructional and functional details of the invention will emerge from the following description, with reference to the attached drawings, in which.

Figure 3:
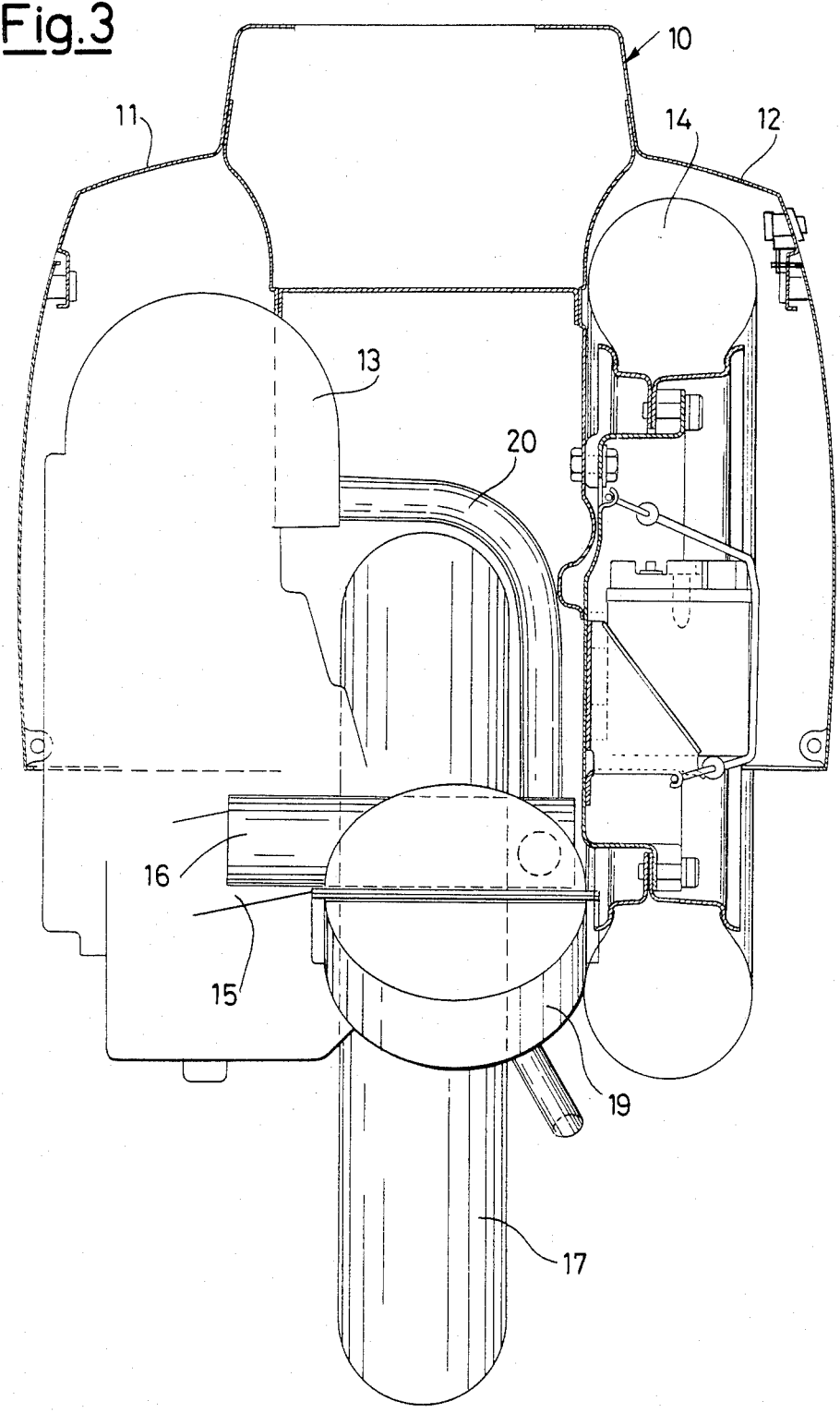
FIG. 3 is a vertical section along the line III—III of FIG. 1.

The bearing body of the motorcycle is illustrated in the drawing only as regards its rear portion, to which the invention relates, and is indicated generally by 10. FIG. 3 shows the two lateral cowls 11 and 12, the former partially housing the engine/transmission assembly, indicated generally by 13, and the latter, in the specific case considered, being intended partially to house a spare wheel 14.

It will be noted that the lateral cowls 11 and 12 form a single whole with the body 10 and that they feature rather narrow apertures, closed by covers provided for the purpose.

The space wheel 14 can be secured by bolts to the sidewall of the body and access to said securing bolts from the outside is possible only after the cover has been opened.

The spare wheel cannot, however, be removed in a lateral direction from the inside of the cowl, but only by sliding it parallel to the sidewall of the body, as is more fully explained and illustrated in a simultaneous patent application of the same Applicant.

The engine/transmission assembly 13 is borne by an oscillating arm 15 fulcrummed at 16 to the bearing body 10, and said arm 15 also bears in cantilever fashion the rear drive wheel 17 of the motorcycle.

Moreover, proximally to its fulcrum 16, said arm 15 has secured to it, by rods 18, the engine exhaust pipe silencer. As it incorporates the customary expansion chamber for the exhaust gas and a pipe for muffling the explosive effect of the exhaust pulsations, the silencer 19 is somewhat bulky, and is connected to the engine exhaust port by an external pipe 20.

Figure 1:
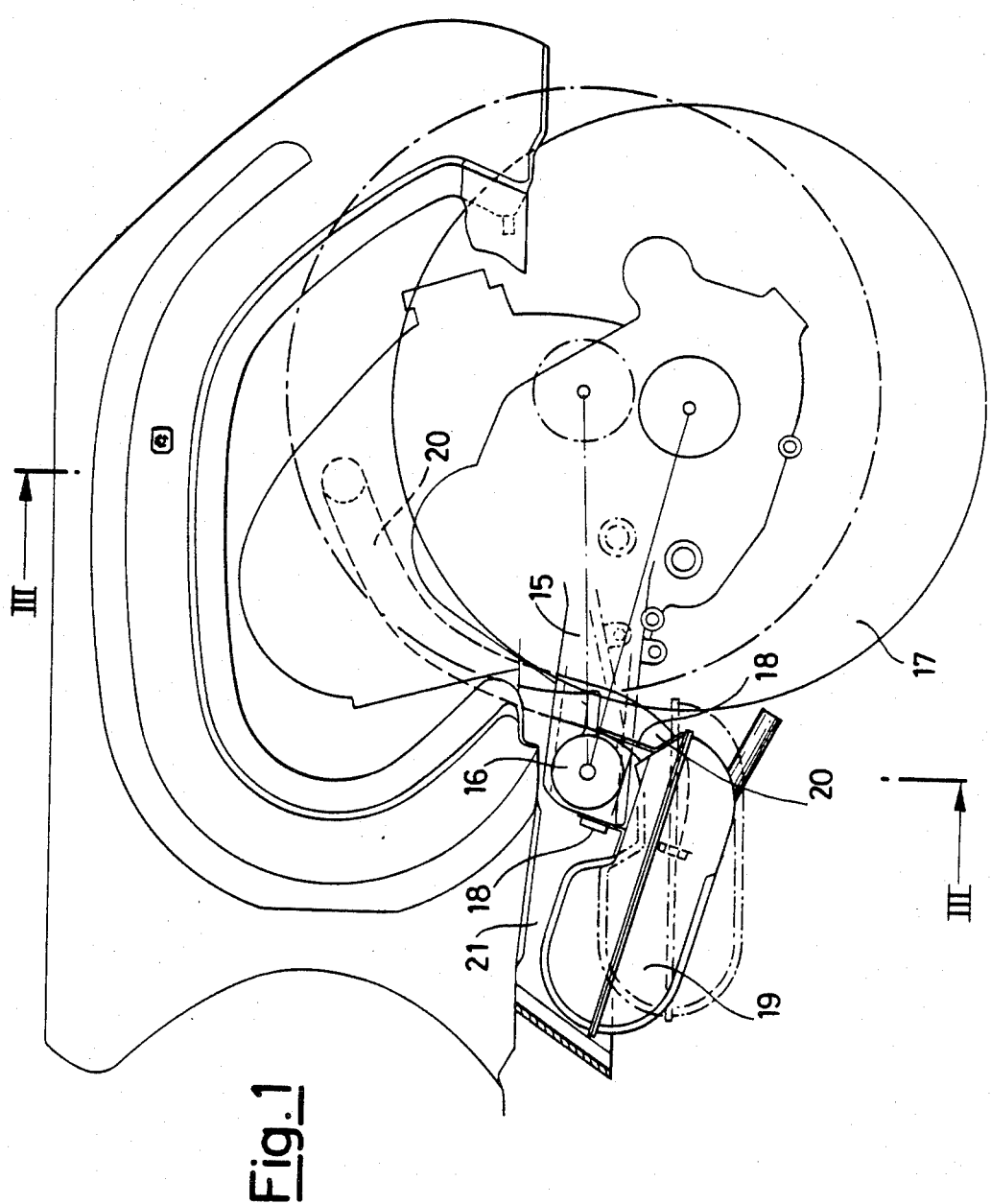
FIG. 1 is a schematic lateral view of the motorcycle with the bearing body according to the invention, partially sectional.
Figure 2:
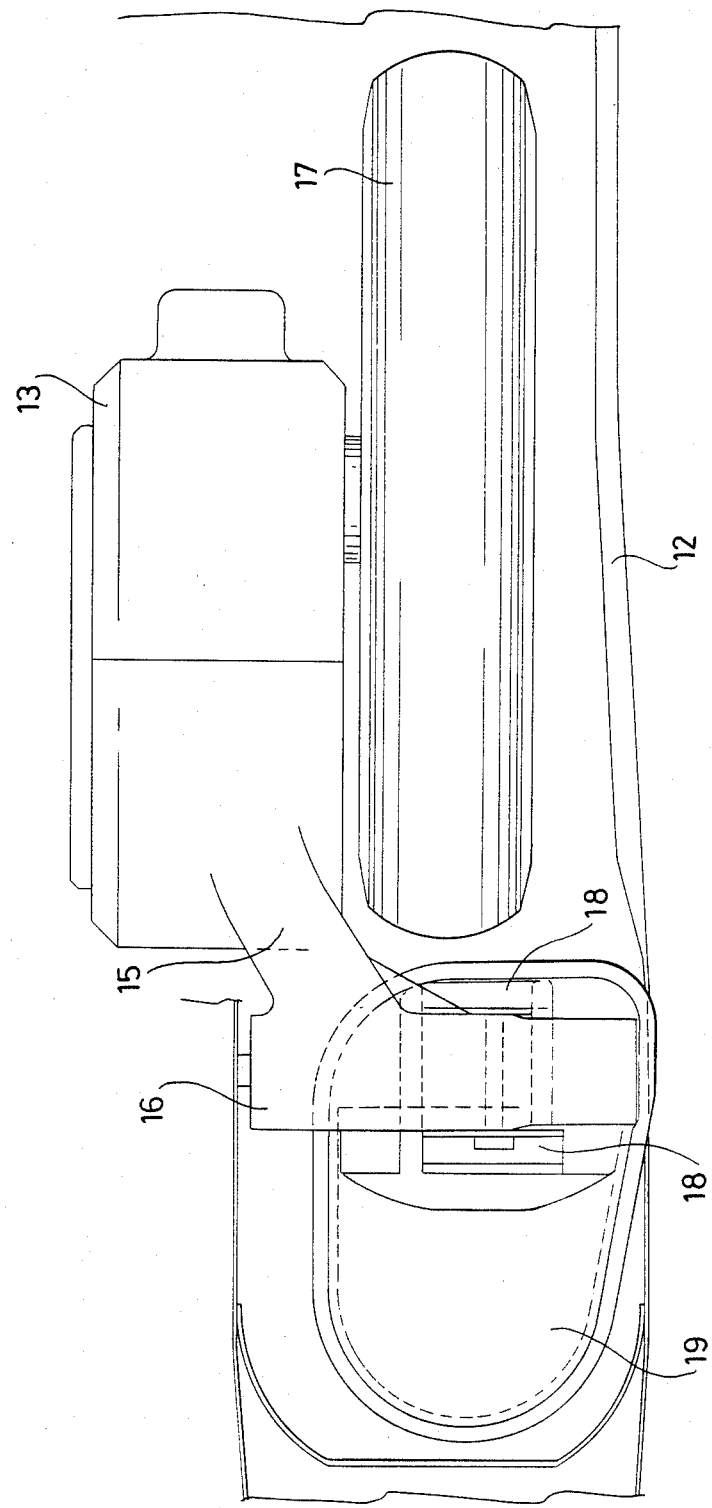
FIG. 2 is a plan view.

As the drawings clearly show, according to the present invention the silencer 19 is substantially disposed on the longitudinal median line of the body 10, in the lower portion of which is a special cavity 21, anterior to the fulcrum 16 of the oscillating arm 15 and thus to the rear drive wheel 17. Said cavity 21 is in its front part appropriately widened and is thus adapted to partially receive the silencer 19 and permit it to oscillate freely (see position shown with dots and dashes in FIG. 1).

It follows that this arrangement of the silencer 19 eliminates all obstacles on the side of the vehicle, particularly beside its rear wheel, while at the same time it obviates all risk of the silencer striking impediments during use of the vehicle.

The shape, size and position of the cavity 21 formed in the lower portion of the bearing structure 10 must, clearly, be decided on in suitable relation to the position, shape and size of the silencer and to the oscillating movements allowed to it, through without undermining the mechanical strength of the bearing body.

The drawing provides a purely schematic representation of the novel concepts described above, which can be embodied employing a large number of variants.

I claim:

1. In a motorcycle: a support body having a longitudinal median plane; an oscillating arm fulcrummed to said body for pivoting movement about an axis transverse to said longitudinal median plane, said arm extending rearwardly of said pivot axis; an engine/transmission assembly carried by said arm at a location rearwardly of said pivot axis and laterally of said longitudinal median plane; a rear wheel drivingly connected to said engine/transmission assembly and located generally in said longitudinal median plane; an exhaust silencer carried by said engine/transmission assembly so as to oscillate therewith, said silencer being located generally in said longitudinal plane and forward of said rear wheel and at least partially forward of said pivot axis whereby the lateral space adjacent said rear wheel on the side thereof opposite said engine/transmission assembly is not encumbered by said silencer, said body having downwardly and inwardly facing walls forming a downwardly facing cavity in which said silencer at least partially resides and oscillates.

2. A motorcycle as in claim 1 wherein said support body includes two lateral cowls on opposite sides of said body, one of said cowls at least partially housing said engine/transmission assembly and the other cowl at least partially housing a spare wheel which is releasably secured to said body.

* * * * *